United States Patent [19]

Potts

[11] 3,990,997

[45] Nov. 9, 1976

[54] METHOD OF PREPARING AMMOXIDATION CATALYST

[75] Inventor: John D. Potts, Springfield, Pa.
[73] Assignee: Suntech, Inc., St. Davids, Pa.
[22] Filed: Oct. 22, 1975
[21] Appl. No.: 624,699

[52] U.S. Cl. ................................ 252/464; 252/461; 260/465 C
[51] Int. Cl.² ...................... B01J 21/04; B01J 23/22
[58] Field of Search ............................ 252/461, 464

[56] References Cited
UNITED STATES PATENTS 3,803,205  4/1974  Shang et al. ................... 252/461 X
3,839,398  10/1974  Leto et al. ..................... 252/461 X

*Primary Examiner*—W. J. Shine
*Attorney, Agent, or Firm*—J. Edward Hess; Donald R. Johnson; Paul Lipsitz

[57] ABSTRACT

A process for preparing a supported α-prime phase vanadium bronze ammoxidation catalyst by forming the α-prime phase in the absence of the support, physically mixing the dry, solid support with the dry, solid catalyst, and calcining the mixture at a temperature of about 400° C. to about 600° C.

2 Claims, No Drawings

METHOD OF PREPARING AMMOXIDATION CATALYST

It is known in the art to carry out ammoxidation of organic compounds, particularly alkyl substituted aromatic compounds such as m- and p-xylene, by use of ammoxidation catalysts. Numerous catalysts for such ammoxidation reactions have been disclosed and in French No. 7433923, which became available May 9, 1975 under special publication as French Patent No. 2,247,452, it is disclosed that particularly effective catalysts are vanadium-alkali metal bronzes supported on α-alumina (alpha-alumina). These bronzes are known in the art and result from the addition of an alkali metal compound to vanadium pentoxide which will, when the mixture is heated, yield complex materials with anomalous valencies known as vanadium bronzes. Such lithium bronzes are discussed by Volkov et al, Zh. Neorg. Khim: 17 (6); 1529–1532 (1972). Vanadium bronzes with sodium are described by Pouchard et al, Bull de la Soc. Chimque de France, No. 7, pages 2742 to 2745 (1968), and No. 11 pages 4343–4348 (1967). Similarly, potassium containing vanadium bronzes are discussed by Holtzberg et al, J. Am. Chem. Soc. Vol. 78, pages 1536–40 (1956). Lithium bronzes are described by Hardy et al, Bull. de la Soc. Chimique de France, No. 4, 1056–65 (1965) and by Reisman et al Jour. Physical Chemistry 66 1181–85 (1962). Also of interest is the article by P. Hagenmuller entitled "Tungsten Bronzes", "Comprehensive Inorganic Chemistry", edited by J. C. Bailar, Jr. et al and published in 1973 by Pergamon Press.

All of the above references as well as the references which follow are hereby incorporated herein to teach the chemistry and preparation of the α-prime (i.e., alpha-prime) phase bronze which is the subject of this invention.

The α-prime phase is a vanadium bronze which is characterized as $Na_xV_2O_5$ where $x=0.7$ to 1.0 (see page 577 of the Hagenmuller article). Also characteristic of this bronze is its x-ray diffraction pattern wherein the strongest lines are as follows:

11.3, 5.645, 4.82, 4.436, 3.667, 3.456, 2.967, 2.889, 2.882, 2.799, 2.604, 2.436, 2.412, 2.291, 2.0196, 1.889, 1.77, 1.689, 1.592, 1.479.

The catalyst support used with the α-prime phase for ammoxidation is comprised of α-alumina. α-Alumina is well known in the art and is exemplified by natural corundum and by the synthetic varieties which are commercially available. These materials have a high density (on the order of about 0.75 to 1.0 gm/cc.) and very low surface area (on the order of 6m²/gm or less). The α-alumina may contain enough sodium ions so that the sodium bronzes may be made without any addition of sodium or other alkali metal compounds. But if insufficient sodium is present, enough may be added to give the desired bronze. One method disclosed in the prior art of making a supported bronze catalyst is to make an aqueous slurry of powdered (170 mesh or finer) α-alumina, alkali metal oxide or water soluble salt and $V_2O_5$, evaporate off the water, pelletize and calcine the pellets at about 500°–600° C. for several hours, while passing a slow flow of air through the furnace. Alternatively the catalyst may be placed on the support by an impregnation technique where an aqueous vanadium oxalate solution containing the appropriate amount of alkali metal is deposited onto the α-alumina support. However, it has been observed that preparation of a catalyst by the above techniques gives bronzes, but the methods are not satisfactory for making an α-prime phase supported catalyst because the α-prime phase is not produced in significant amounts. For example, when an appropriate mixture of sodium vanadate and $V_2O_4$ (mole ratio of $V_2O_4:NaVO_3=1:2$) is mixed and calcined with the α-alumina support at 400° to 500° C. in the typical catalyst preparation method, bronzes other than the α-prime phase are formed. However, it has now been found that an α-prime catalyst can be obtained by the process of this invention which comprises the steps of (a) forming the α-prime phase in the absence of the support, (b) physically mixing the dry, solid α-alumina support with the dry solid α-prime phase catalyst, and (c) calcining the pelleted mixture at a temperature of about from 400° C. to about 600° C.

The formation of the α-prime phase in the absence of a support is readily accomplished by simply mixing the appropriate dry components (e.g. $V_2O_4$ and $NaVO_3$), heating and cooling in an inert atmosphere. For example, $V_2O_4$ and $NaVO_3$ in a mole ratio of 1:2 are simply mixed, heated at 600° C. in a stream of nitrogen or other inert gas for about 4 hours and then cooled. Alternatively, the component mixture may be heated in a rotary kiln. After the bronze is formed it is simply mixed thoroughly with the powdered α-alumina support, slurried with water, pelleted and heated in nitrogen or other inert gas at about 400° C for one to four hours. Analysis of the cooled mixture by x-ray diffraction readily indicates the presence and amount of the α-prime phase catalyst since the X-ray intensities are measured in counts per second at a given d-value and thus can be used for identification.

As indicated, the catalyst support will be comprised of α-alumina, but it will be understood that it may contain other components such as silica and other metal oxides as well as the normal contaminants found in α-alumina; e.g. iron, magnesium, and the like. However, at least about 75% by weight of the support will be α-alumina.

The amount of catalyst on the support (e.g., catalyst loading) for use as an ammoxidation catalyst will be from about 1% to 20% by weight of the support, preferably about 3% to about 8%. The amount of α-alumina support will, by difference be from about 99 to 80% by weight, preferably about 97 to 92%. The surface area of the catalysts used in the process is generally quite low being less than 10m²/gm and usually 1 to 5m²/gm. Pore volume of the catalyst is such that the major proportion of the pores have diameters less than about 1 micron, being on the order of about 0.2 to 1.0 micron.

In order to further illustrate the invention the following examples are given.

EXAMPLE 1 (672057-2)

A mixture of 90.98 parts by weight of α-alumina powder (Alcoa T-71 Tabular Alumina which contains 0.01 weight percent of $Na_2O$), 3.65 parts of $V_2O_4$ and 5.37 parts of $NaVO_3$ (mole ratio of $V_2O_4:NaVO_3=1:2$) was thoroughly mixed, slurried with enough water to make a thick paste, pelletized, and calcined at 600° C. for 4 hours in a muffle furnace while nitrogen at 2.5 l/min. was passed through. The cooled mass was analyzed by X-ray diffraction and found to contain vanadium bronzes, but no α-prime phase. Thus, the method of the prior art is not operable for obtaining the α-prime phase catalyst.

Similar experiments at 400° C. instead of 600° C. calcining temperature also failed to give the desired α-prime phase.

EXAMPLE 2 (672065)

A mixture of 9 parts by weight of previously made powdered α-prime phase catalyst and 91 parts of powdered α-alumina (Alcoa T-61 Tabular alumina which contained 0.08% $Na_2O$) was thoroughly mixed, slurried with enough water to make a thick paste, pelletized and calcined at 600° C. for 4 hours in a muffle furnace under nitrogen. The cooled mass was analyzed by x-ray diffraction and found to be very high in α-prime phase content and very low in other bronzes and $NaVO_3$.

EXAMPLE 3 (672067)

As in Example 2 a mixture of 9 parts of previously made powdered α-prime phase catalyst and 91 parts of α-alumina (T-61) was mixed, pasted with water, pelletized and calcined at 400° C. for 4 hours under 2.5 l/min. of nitrogen. As before, x-ray diffraction showed α-prime phase to be the predominant component.

The invention claimed is:

1. A process for preparing alpha-prime phase vanadium bronze ammoxidation catalyst supported on alpha-alumina and characterized by the formula $Na_xV_2O_5$ where $x$ is from 0.7 to 1.0, which comprises forming the said catalyst in the absence of the support, physically mixing the dry, solid support with the dry, solid catalyst, and calcining the mixture at a temperature of about 400° C. to about 600° C.

2. A process for preparing a supported alpha-prime phase vanadium bronze ammoxidation catalyst which comprises:
   a. preparing the said catalyst by mixing $V_2O_4$ and $NaVO_3$ in a mole ratio of 1:2 and heating the mixture at about 600° C. in an inert gas,
   b. physically mixing from about 1 to about 20 parts by weight of the dry alpha-prime phase vanadium bronze with from about 99 to about 80 parts of dry alpha-alumina, and
   c. calcining the mixture at a temperature of from about 400° C. to about 600° C. in an inert gas.

* * * * *